(12) United States Patent
Oka

(10) Patent No.: US 7,236,216 B2
(45) Date of Patent: Jun. 26, 2007

(54) LIQUID CRYSTAL MODULE

(75) Inventor: Masaharu Oka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 32 days.

(21) Appl. No.: 11/188,103

(22) Filed: Jul. 25, 2005

(65) Prior Publication Data

US 2006/0023141 A1    Feb. 2, 2006

(30) Foreign Application Priority Data

Jul. 27, 2004    (JP)    ............................. 2004-218111

(51) Int. Cl.
*G02F 1/1333*    (2006.01)
*G02F 1/1335*    (2006.01)

(52) U.S. Cl. ........................... 349/58; 349/61; 349/112

(58) Field of Classification Search .................. 349/58, 349/61, 112; 200/302.1
See application file for complete search history.

(56) References Cited

U.S. PATENT DOCUMENTS

| | | | | |
|---|---|---|---|---|
| 6,554,461 B2 * | 4/2003 | Yamada et al. | ............. | 362/546 |
| 6,611,302 B1 * | 8/2003 | Ueda et al. | ................... | 349/58 |
| 6,992,734 B1 * | 1/2006 | Morishita et al. | ............. | 349/58 |
| 7,050,128 B2 * | 5/2006 | Lee et al. | ...................... | 349/58 |
| 2004/0114062 A1 * | 6/2004 | Nishio et al. | ................. | 349/58 |
| 2004/0223092 A1 * | 11/2004 | Wu et al. | ..................... | 349/58 |
| 2005/0073622 A1 * | 4/2005 | Kitaka et al. | ................. | 349/58 |
| 2006/0027449 A1 * | 2/2006 | Silva et al. | ............. | 200/302.1 |

FOREIGN PATENT DOCUMENTS

| | | |
|---|---|---|
| JP | 05-107529 A | 4/1993 |
| JP | 06-139766 A | 5/1994 |
| JP | 2003-162907 A | 6/2003 |

* cited by examiner

*Primary Examiner*—N. Drew Richards
*Assistant Examiner*—Matthew P. Lawson
(74) *Attorney, Agent, or Firm*—Global IP Counselors, LLP

(57) ABSTRACT

A liquid crystal module includes an annular casing molded from resin, a diffuser panel attached to a front side of the casing, a liquid crystal cell disposed on the front side of the casing so as to close a front side of the diffuser panel, and a substrate attached to a rear side of the casing. The casing has a through hole that is formed on an outer peripheral portion of the casing, and a catch formed at a front end of the through hole. The diffuser panel closes the through hole from the front side of the casing. The substrate is attached to the rear side of the casing to close the through hole from the rear side. It is possible to prevent outside dust from entering into the space between the liquid crystal panel and the diffuser plate through the through hole.

10 Claims, 7 Drawing Sheets

LIQUID CRYSTAL MODULE

BACKGROUND OF THE INVENTION

1. Field of the Invention

The present invention relates to a liquid crystal module.

2. Background Information

With a direct backlight type of liquid crystal module in which the light source is disposed along the back of a liquid crystal panel, the liquid crystal panel is disposed on the front side of the casing of the liquid crystal module, a diffuser plate is disposed on the back side of the casing, and the space inside the casing in which the light source is disposed is sealed off at this diffuser plate.

One way in which the space inside the casing is sealed off is with an adhesive tape. The gap at the attachment portion between the liquid crystal panel and diffuser plate and the casing is closed with an adhesive tape, which prevents dust from getting into the casing. However, using an adhesive tape results in additional manufacturing cost and also requires a process of attaching the tape.

Another way to close the space inside the casing is to fit the diffuser plate onto a catch provided to the casing, and attach the liquid crystal panel so as to cover the diffuser plate. This method reduces manufacturing cost, improves the work efficiency, and also prevents warping of the diffuser plate.

When this method is employed, however, it is difficult to prevent dust infiltration. In general, the casing portion of a liquid crystal module is molded from a resin in a mold. When the catch, onto which the diffuser plate is fitted, is molded, through holes that go through the casing are also formed automatically near the catch. It is possible that dust from the outside could get inside the liquid crystal module through these through holes. In particular, since there is a gap between the diffuser plate and the catch, dust can get in through this gap, which means that dust can work its way inside the space between the liquid crystal panel and the diffuser plate. When dusts are inside the space, such dust can show through the liquid crystal panel during the use of the liquid crystal panel, and lead to defects in the liquid crystal display.

As a means for preventing dust from entering inside a liquid crystal module, for example, Japanese Patent Application Publication No. 2003-162901 (P. 5, FIG. 4) discloses a liquid crystal display device having a structure in which the gap between the diffuser plate and the frame portion of the casing is sealed off with a sealing member, and a structure in which the gap between the liquid crystal panel and the frame member is sealed off with a spacer member. Japanese Patent Application Publication No. H5-107529 (p. 2, FIGS. 1, 2, and 4) discloses a liquid crystal display device having a structure in which an elastic member is disposed at the gap between the liquid crystal panel and the backlight. Japanese Patent Application Publication No. H6-139766 (p. 3, FIGS. 1 to 3 and FIG. 6.) discloses prevention of dust from getting into a housing disposed inside an optical information recording and reproduction device. Japanese Patent Application Publication No. H6-139766 discloses a structure in which an insulating member and a circuit board are attached in that order so as to cover substantially the entire bottom of the housing, and the openings formed in the circuit board are sealed off with soldering.

The disclosures in Japanese Patent Application Publications Nos. 2003-162901 and H5-107529 prevent dust from entering by attaching the casing of the liquid crystal module to the liquid crystal panel and the diffuser plate. However, this method is difficult to apply to a liquid crystal module in which a catch is formed on the casing and the diffuser plate is fitted onto this catch as discussed above. More specifically, it is extremely difficult to attach a member in a tiny gap between the catch and the diffuser plate. Therefore, work efficiency is compromised. Furthermore, providing such a member increases the manufacturing cost. Also, there is the danger that the catch may be deformed or bent in the course of attaching the member to the catch. It is particularly difficult to repeatedly attach and remove the diffuser plate.

The Japanese Patent Application Publication No. H6-139766, meanwhile, discloses a structure in which dust is prevented from entering by using an insulating member and a circuit board. However, when a structure thus involving a number of parts is applied to a liquid crystal module, it increases the manufacturing cost, and also makes the liquid crystal module undesirably larger and thicker. Furthermore, the use of solder increases manufacturing costs and lowers work efficiency.

In view of the above, it will be apparent to those skilled in the art from this disclosure that there exists a need for an improved liquid crystal module that overcomes the problems of the conventional art. This invention addresses this need in the art as well as other needs, which will become apparent to those skilled in the art from this disclosure.

SUMMARY OF THE INVENTION

It is an object of the present invention to provide a liquid crystal module in which outside dust is less likely to enter into the space between the liquid crystal panel and the diffuser plate.

A liquid crystal module in accordance with the first aspect of the invention includes an annular casing molded from resin and having a through hole that is formed on an outer peripheral portion of the casing, and a catch portion formed at a front end of the through hole, a diffuser panel attached to a front side of the casing so as to close the through hole from the front side, a liquid crystal cell disposed on the front side of the casing so as to cover a front side of the diffuser panel, and a substrate attached to a rear side of the casing from the rear side, the substrate closing the through hole from the rear side.

With this direct backlight type of liquid crystal module, since the substrate is disposed so as to close the through hole formed in the outer peripheral portion of the casing, not only can dust be prevented from entering the space between the liquid crystal cell and the diffuser plate through the through hole, but also any dust that has adhered near the through hole can be prevented from entering the space between the liquid crystal cell and the diffuser plate.

The liquid crystal module in accordance with the second aspect of the invention is the liquid crystal module of the fist aspect, wherein the catch portion is tapered toward its tip end.

With this liquid crystal module, since the catch portion is tapered toward the tip end, the diffuser plate can be more easily attached to the casing with the catch portion.

The liquid crystal module in accordance with the third invention is the direct backlight type of liquid crystal module of the first or second aspect of the invention, wherein a rib portion is formed on the casing so as to surround the through hole formed in the outer peripheral portion of the casing.

With this liquid crystal module, since the rib portion is formed at the peripheral edge of the through hole formed in the outer peripheral portion of the casing, any dust that has adhered near the through hole is prevented from entering the space between the liquid crystal cell and the diffuser plate through the through hole.

The liquid crystal module in accordance with the fourth invention is the liquid crystal module of the third aspect of the invention, wherein the casing has a boss portion formed near the rib portion, and a tip surface of the rib portion and a tip surface of the boss portion have the same angle of inclination, such that rear frame is tightly attached to the tip surface of the boss portion from the rear side and the relay board is tightly attached to the tip surface of the rib portion from the rear side.

With this liquid crystal module, the height of the rib portion formed at the peripheral edge of the through hole is substantially the same as the height from the base to the tip of the boss portion. Also, the angles of inclination of the tip face of the rib portion and the tip face of the boss portion are substantially equal with respect to the horizontal direction. Thus, and the substrate is tightly attached to the tip faces of the rib portion and the boss portion. Thus, when the substrate is disposed so as to close the through hole formed in the outer peripheral portion of the casing, the through hole can be closed without any gaps, which prevents any dust that has adhered near the through hole from entering the space between the liquid crystal cell and the diffuser plate through the through hole.

The liquid crystal module in accordance with the fifth invention is the liquid crystal module of the fourth aspect of the invention, wherein the substrate and the boss portion are fastened with a screw.

With this liquid crystal module, since the substrate can be securely coupled to the casing by fastening the substrate and the boss portion with a screw, any dust that has adhered near the through hole can be prevented from entering the space between the liquid crystal cell and the diffuser plate through the through hole.

The liquid crystal module pertaining to the sixth aspect of the invention is the liquid crystal module of any of the first through fifth aspects, wherein the substrate includes a metal rear frame that has a substantial U-shaped cross sectional shape, and the rear frame is attached to the boss portion from the rear side.

With this liquid crystal module, since the substrate and the boss portion are disposed flanking the metal rear frame when fastened, this arrangement also serves to ground the substrate.

The liquid crystal module pertaining to the seventh aspect of the invention is the liquid crystal module of the sixth aspect, wherein the substrate further includes a relay board that is attached to the rear frame from the rear side, and the through hole is closed with the relay board from the rear side.

The liquid crystal module pertaining to the eighth aspect of the invention is the liquid crystal module of the sixth aspect, wherein the through hole is closed with the rear frame from the rear side.

The liquid crystal module pertaining to the ninth aspect of the invention is the liquid crystal module of the fourth aspect, wherein the casing has a plurality of boss portions and a plurality of through holes formed thereon, and the substrate is attached to the plurality of boss portions from the rear side, and closes the plurality of through holes from the rear side.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Structure

Figure 1:
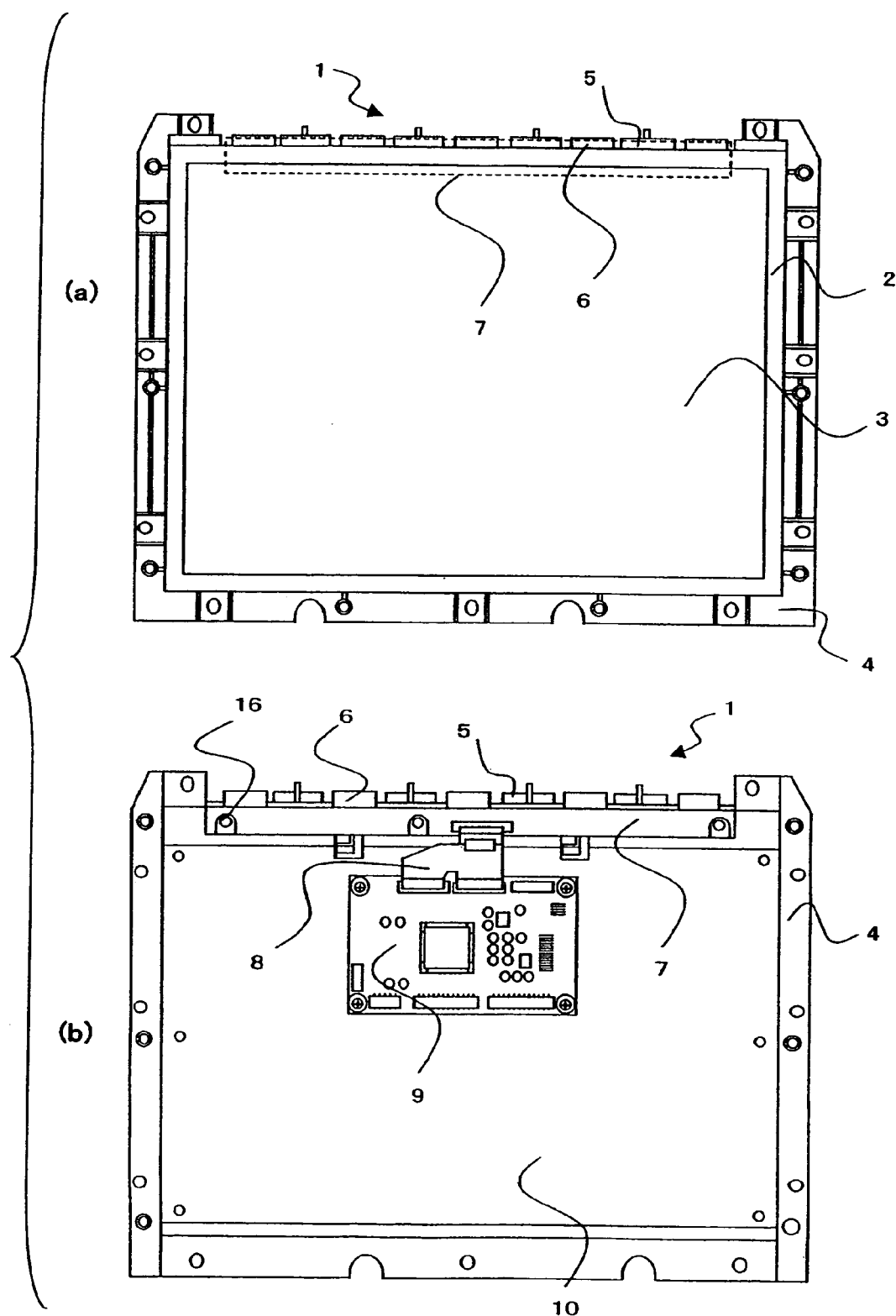
FIGS. 1a and 1b are a front view and a rear view of the liquid crystal module in accordance with an embodiment of the present invention.
Figure 2:
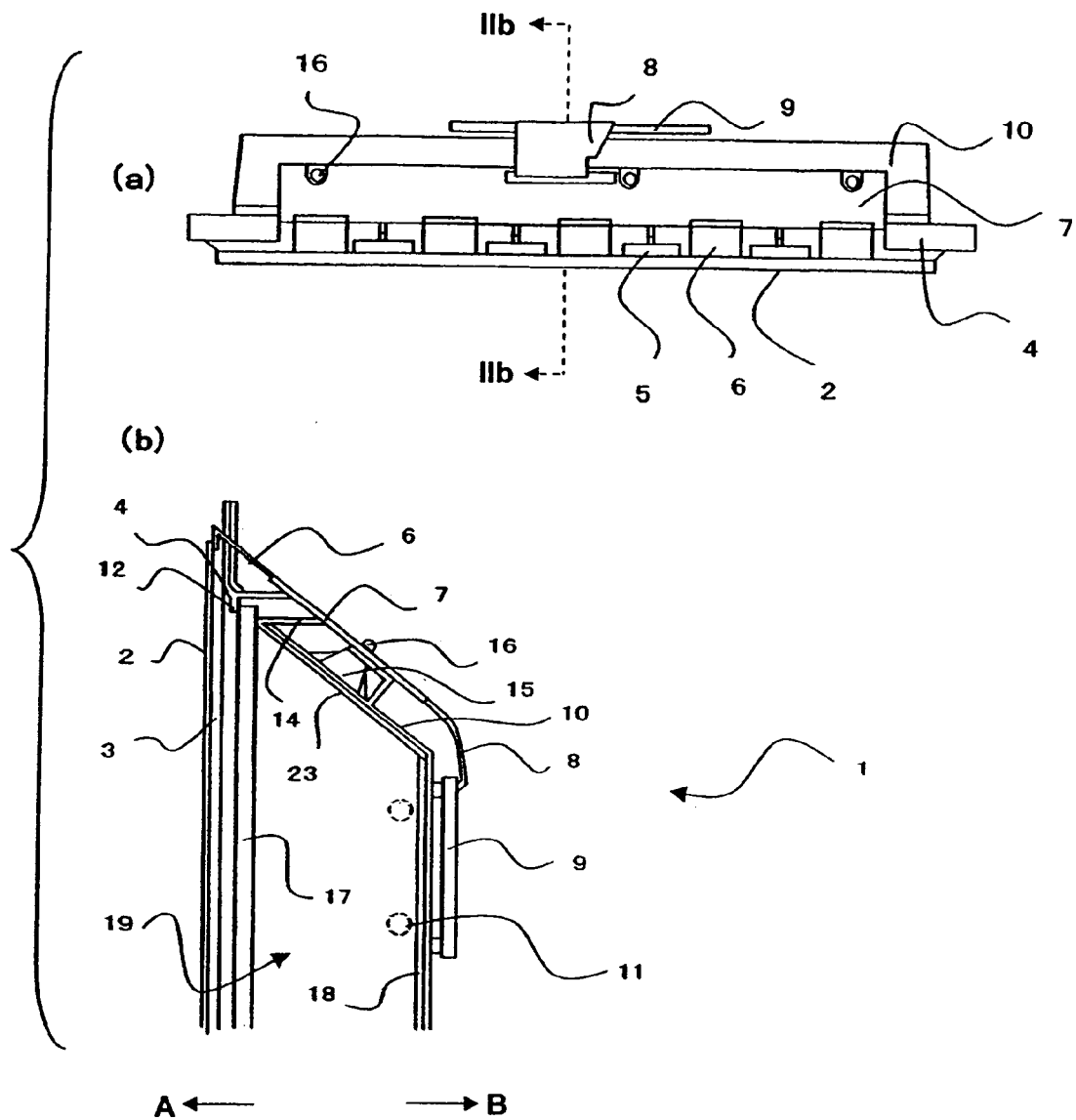
FIG. 2a are a schematic top view of the liquid crystal module of this embodiment.
FIG. 2b is a side cross sectional view of the liquid crystal module of this embodiment as viewed from the line IIb—IIb in FIG. 2(a)
Figure 3:
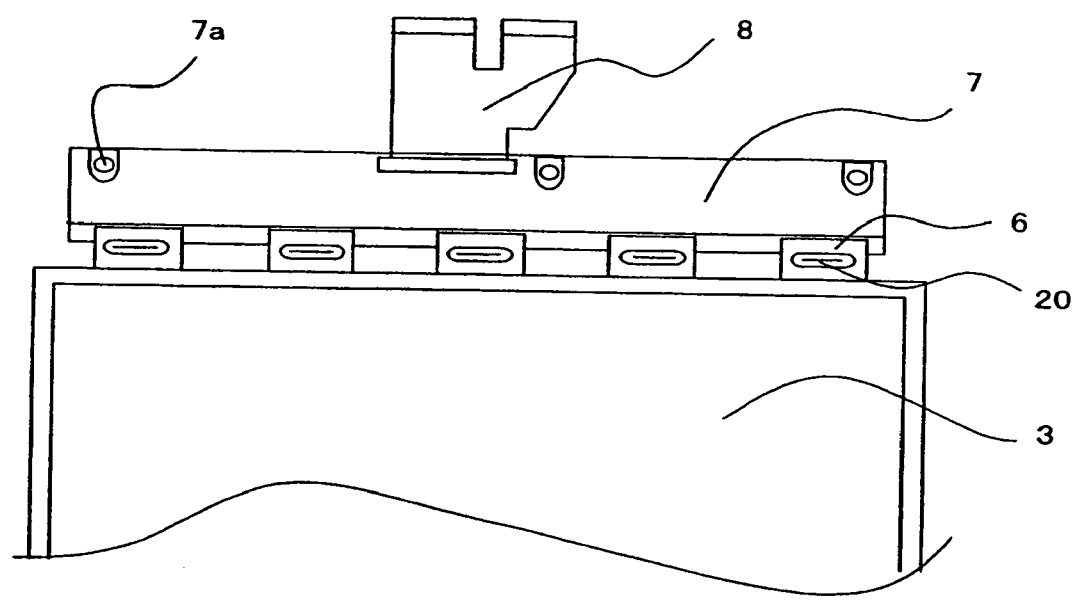
FIG. 3 is a schematic view of the liquid crystal cell and the relay board of this embodiment.
Figure 4:
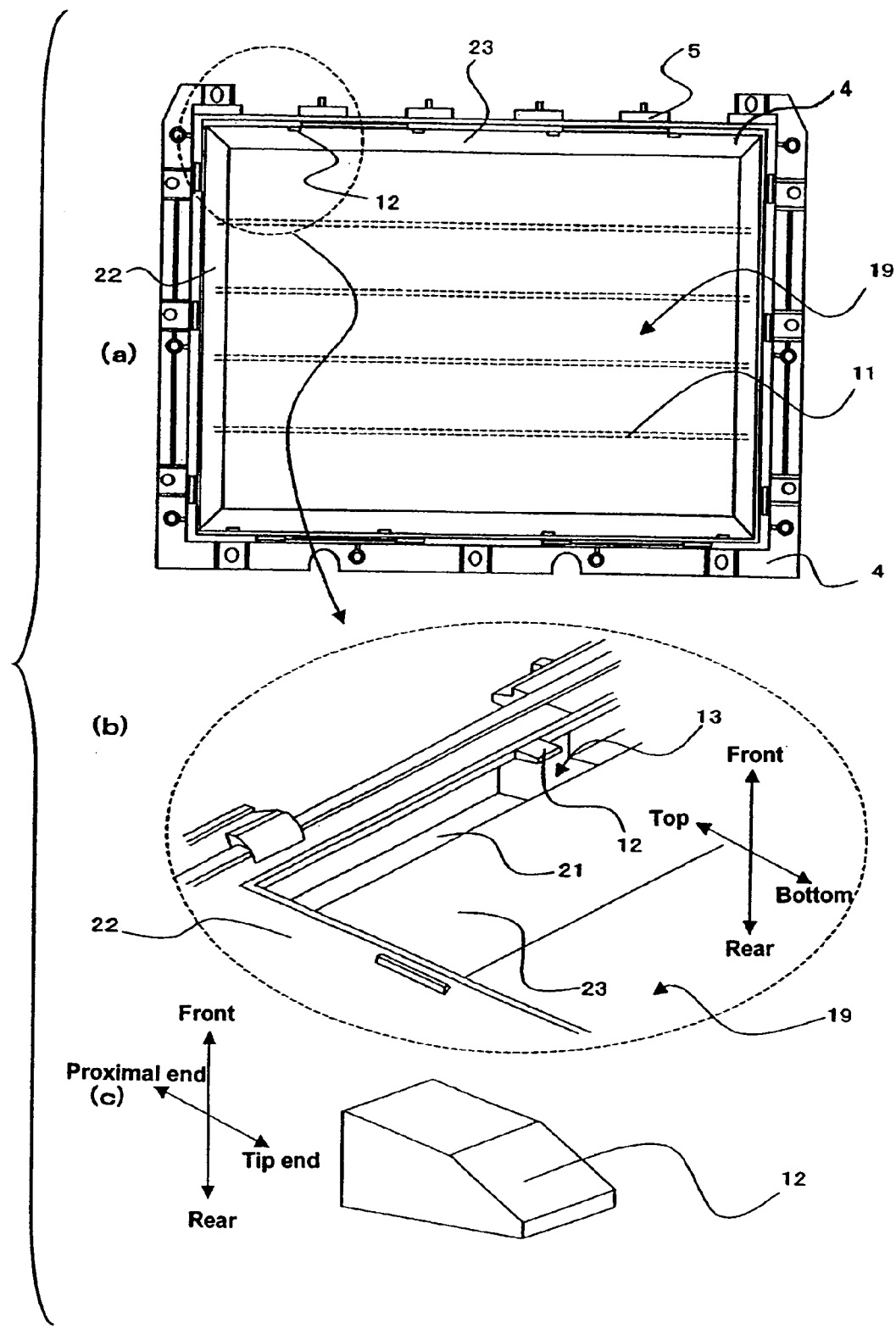
FIG. 4a is a front view of the reflector frame of this embodiment.
FIG. 4b is a detailed view of the area around the catch encircled by the dotted line in FIG. 4a, and FIG. 4c is a further detailed view of the catch of the reflector frame of this embodiment.
Figure 5:
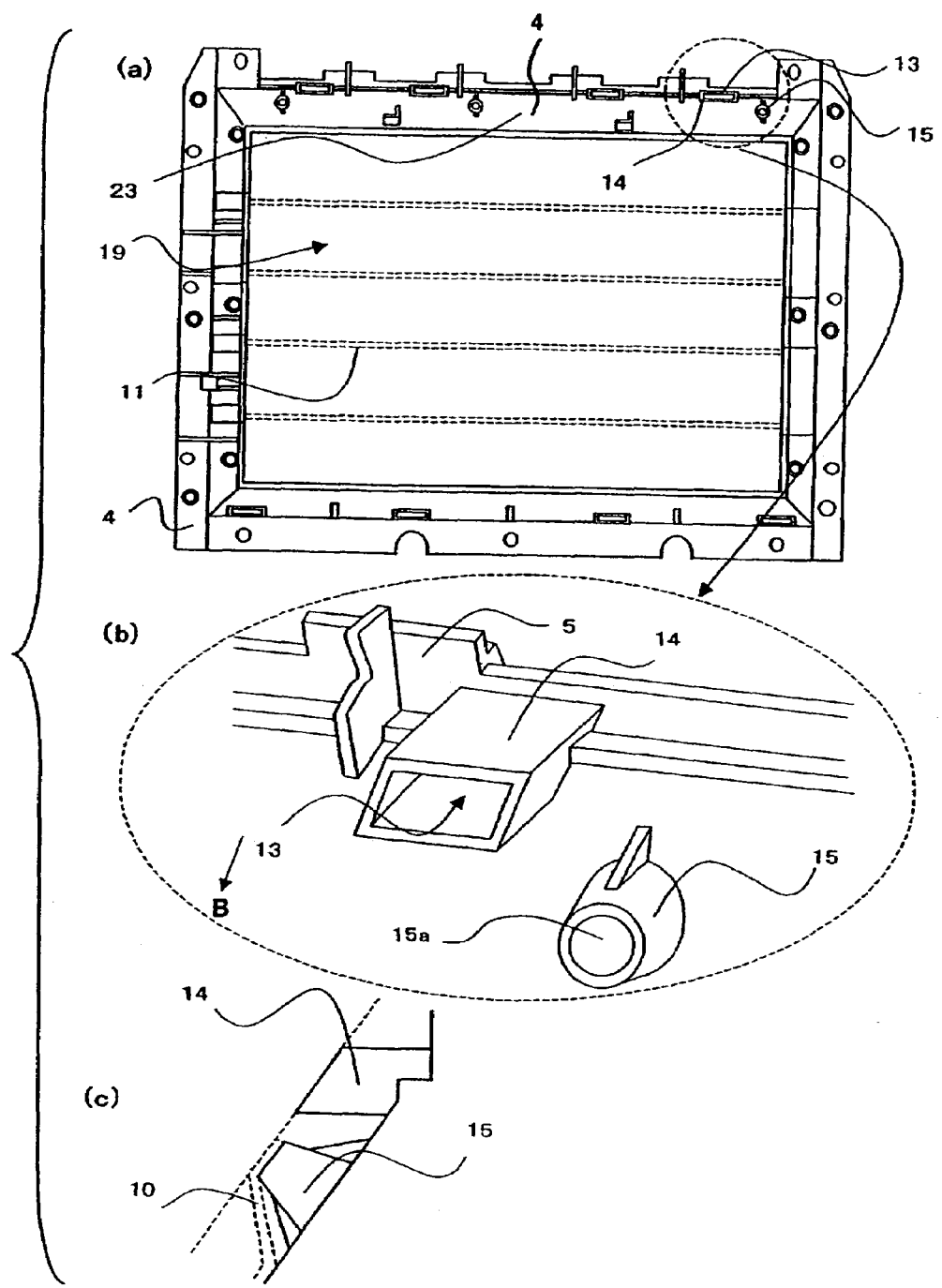
FIG. 5a is a rear view of the reflector frame of this embodiment.
FIG. 5b is a detailed view of the area around the through hole and the boss encircled by the dotted line in FIG. 5a, and FIG. 5c is a schematic cross sectional view of the through hole and the boss of the reflector frame of this embodiment.

The overall structure related to the liquid crystal module 1 pertaining to an embodiment will be described through reference to FIGS. 1 to 5. FIG. 1a is a front view of the direct backlight type of liquid crystal module 1 in accordance with this embodiment, and FIG. 1b is a rear view of the liquid crystal module 1. FIG. 2a is a top view of the liquid crystal module 1, and FIG. 2b is a cross sectional view of the liquid crystal module 1. Hereinafter, the arrow A indicates the front side of the liquid crystal module 1, and the arrow B indicates the rear side of the liquid crystal module 1. FIG. 3 is a detail view of a liquid crystal cell 3 of the liquid crystal module 1, and members connected to the top thereof. FIG. 4a is a front view of a reflector frame 4 of the liquid crystal module 1, and FIG. 5a is a rear view of the reflector frame 4.

The liquid crystal module 1 in accordance with this embodiment is a direct backlight type liquid crystal module. The liquid crystal module 1 includes a bezel 2, a liquid crystal cell 3, a diffuser panel 17, a reflector frame 4, cold cathode tubes 11, a reflector sheet 18, a rear frame 10, FPCs (Flexible Printed Circuit) 6, a relay board 7, an FPC 8, and a digital PCB (Printer Circuit Board) 9.

The bezel 2 is a metal frame, and is disposed at the peripheral edge of the liquid crystal cell 3 (see FIGS. 1a and 2b). The liquid crystal cell 3 is, for instance, a 15-inch image display panel in which liquid crystals are sandwiched between two glass substrates (not shown). The liquid crystal cell 3 is disposed on the front side of the reflector frame 4 (see FIG. 2b). The diffuser panel 17 is used to let light from the cold cathode tubes 11 disposed inside the reflector frame 4 irradiate uniformly in the liquid crystal cell 3. The diffuser panel 17 is disposed so as to seal off the front side of an opening 19 formed in the reflector frame 4 (see FIGS. 2b and 4b).

The reflector frame 4 is a substantially rectangular frame molded from a polycarbonate resin, and is formed with the opening 19, which penetrates all the way through from the front to the back of the reflector frame 4 (see FIGS. 4a and 5a). The reflector frame 4 functions as the casing of the liquid crystal module 1, and also reflects the light from the cold cathode tubes 11 toward the liquid crystal cell 3 side.

The cold cathode tubes 11 are an illumination device disposed on the back side of the reflector frame 4, and supply light to the liquid crystal cell 3 from the rear (see FIG. 2b). Four of the cold cathode tubes 11 are used in the liquid crystal module 1 in this embodiment, although any number of cold cathode tubes 11 other than four may be employed. As shown in FIG. 4a, each of the cold cathode tubes 11 is laid out horizontally, and is lined up in the vertical direction of the reflector frame 4.

Any light from the cold cathode tubes 11 not traveling toward the liquid crystal cell 3 is reflected toward the liquid crystal cell 3 by the reflector sheet 18, which is used to increase the light utilization efficiency. The reflector sheet 18 is also disposed to seal off the back side of the opening 19 of the reflector frame 4.

The rear frame 10 is a metal frame that has a substantially U-shaped cross sectional shape, and is disposed so as to cover the reflector sheet 18 from the rear side of the reflector frame 4. At the same time, the rear frame 10 is disposed so as to cover part of the top and bottom sides of the reflector frame 4 (see FIGS. 2b and 1b).

The FPCs 6 are flexible circuit boards (Flexible Printed Circuit) on which driver ICs 20 are mounted for outputting a drive signal to the data line of the liquid crystal cell 3 (see FIG. 3). The FPCs 6 are connected to the liquid crystal cell 3 and the relay board 7 (discussed below), and are disposed on the outside at the top side of the reflector frame 4 (see FIGS. 3, 2a, and 2b). The relay board 7 is a circuit board that relays signals between the digital PCB 9 and the driver chips 20 mounted on the FPCs 6. This relay board 7 is connected to the FPCs 6 and the FPC 8, and is disposed on the outside at the top side of the reflector frame 4 (see FIGS. 3, 2a, and 2b).

The digital PCB 9 is a circuit board that outputs image data to the driver chip on the data line side, and is connected to the FPC 8. As seen in FIGS. 1b, 2a, and 2b, the digital PCB 9 is disposed on the rear frame 10. In other words, the liquid crystal cell 3, the FPCs 6, the relay board 7, the FPC 8, and the digital PCB 9 are connected in that order, which allows the image data signals from the digital PCB 9 to be outputted through the relay board 7 to the driver chips 20 that are mounted on the FPCs 6, to supply drive signals to the data lines of the liquid crystal cell 3. Regarding scan lines of the liquid crystal cell 3, driver ICs (not shown) that supply scanning signals to the scan lines of the liquid crystal cell 3 are mounted by the COG (Chip On Glass) technology near the peripheral edge on the front side of the liquid crystal cell 3. The COG technology is well known to one of the ordinary skill in the art. Therefore, details of the COG technology will not be described herein.

Structure of the Reflector Frame 4

FIG. 4a shows the front side of the reflector frame 4 of the liquid crystal module 1 of this embodiment. FIG. 4b is a detailed oblique view of the area of the reflector frame 4 encircled in FIG. 4a, as seen from the left side 22. A border 21 having a predetermined width is formed at the inner peripheral edge on the front side of the rear frame 10 formed in the reflector frame 4.

Catches 12 are formed at the top and bottom sides of the four peripheral edges bordering the opening 19 of the reflector frame 4. As shown in detailed view in FIG. 4c, the catch 12 has a substantially rectangular front side, which faces the front side of the reflector frame 4. The shape of the lateral sides, which are substantially perpendicular to this front side, is tapered, narrowing from the proximal end toward the tip.

The distance between the catch 12 and the border 21 is substantially the same as the thickness of the diffuser panel 17. The diffuser panel 17 is fixedly coupled to the reflector frame 4 by being fitted in between the catches 12 and the border 21. In other words, the diffuser panel 17 closes the through holes 13 from the front side of the reflector frame 4. The catches 12 are molded from resin unitarily with the reflector frame 4. During the resin molding of the catches 12, through holes 13, which are substantially rectangular in cross sectional view, are formed so as to penetrate through the reflector frame 4 from the inside to the outside.

FIG. 5a shows the back side of the reflector frame 4 in accordance with this embodiment. FIG. 5b is a detailed view of the area encircled by the dotted line in FIG. 5a near one of the through holes 13 molded on the back side of the reflector frame 4. FIG. 5c is a schematic side view of the through hole 13 and the boss 15 shown in FIG. 5b, the right hand side being the front side of the reflector frame 4.

As shown in FIG. 2b, the top side 23 of the reflector frame 4 is inclined at a specific angle to the horizontal direction. The through holes 13, ribs 14, and bosses 15 are formed on this top side 23. The cylindrical ribs 14 are formed at the peripheral edge of the through holes 13 so as to surround the through holes 13. A screw hole 15a where a screw is to be attached is formed at the tip of each boss 15. As shown in FIG. 5c, a rear frame 10 is disposed at the tip faces of the bosses 15. In this embodiment, the sum of the height from the base to the tip of the boss 15 and the thickness of the rear frame 10 is the substantially same as the height from the base to the tip of the rib 14. Also, the angles of inclination of the tip faces of the ribs 14 and the bosses 15 with respect to the horizontal direction are substantially the same. Therefore, the tip faces of the ribs 14 and the tip faces of the bosses 15 are tightly attached to the relay board 7 and the rear frame 10, which collectively constitute a substrate of the liquid crystal module 1 of the present embodiment.

As discussed above, the relay board 7 is disposed on the outer side of the top side 23. The relay board 7 here is tightly attached to the tip faces of the bosses 15 and the ribs 14 at the top side 23 of the reflector frame 4. More specifically, the relay board 7 is attached with screwing screws 16 to screw holes 7a that are formed on the relay board 7 (see FIGS. 2(a) and 2(b)), through holes (not shown in Figures) that are formed on the rear frame 10, and the screw holes 15a that are formed at the tips of the bosses 15. As seen in FIGS. 2a and 2b, the relay board 7 and the bosses 15 are attached to one another so that the rear frame 10 is interposed between the relay board 7 and the bosses 15.

OTHER EMBODIMENTS

In the forgoing embodiment, the top side 23 of the reflector frame 4 is inclined at a specific angle relative to the horizontal direction. However, the present invention is not limited to this construction, and the shape of the reflector frame 4 can be substantially cuboid and the inclination of the top side 23 with respect to the horizontal direction can be substantially zero.

Also, in the forgoing embodiment, the reflector frame 4 is substantially a rectangular and annular ring with the opening 19 penetrating through the front to the back. Alternatively, the reflector frame 4 can be resin-molded so as that the back side of the opening 19 is closed. In this case, the user can decide whether or not to use the metal rear frame 10 as necessary. When the rear frame 10 is not used, the digital PCB 9 must be attached to the back side of the reflector frame 4, so attachment catches are provided to the reflector frame 4 to allow the digital PCB 9 to be attached thereto.

Also in the forgoing embodiment, the rear frame 10 is disposed on the rear side of the reflector frame 4. However, the rear frame 10 need not be used. In this case, the relay board 7 can be securely attached to the bosses 15 by making the length from the base to the tip of the bosses 15 longer by the thickness of the rear frame 10, and making the length from the base to the tip substantially the same for the ribs 14 and the bosses 15.

Figure 6:
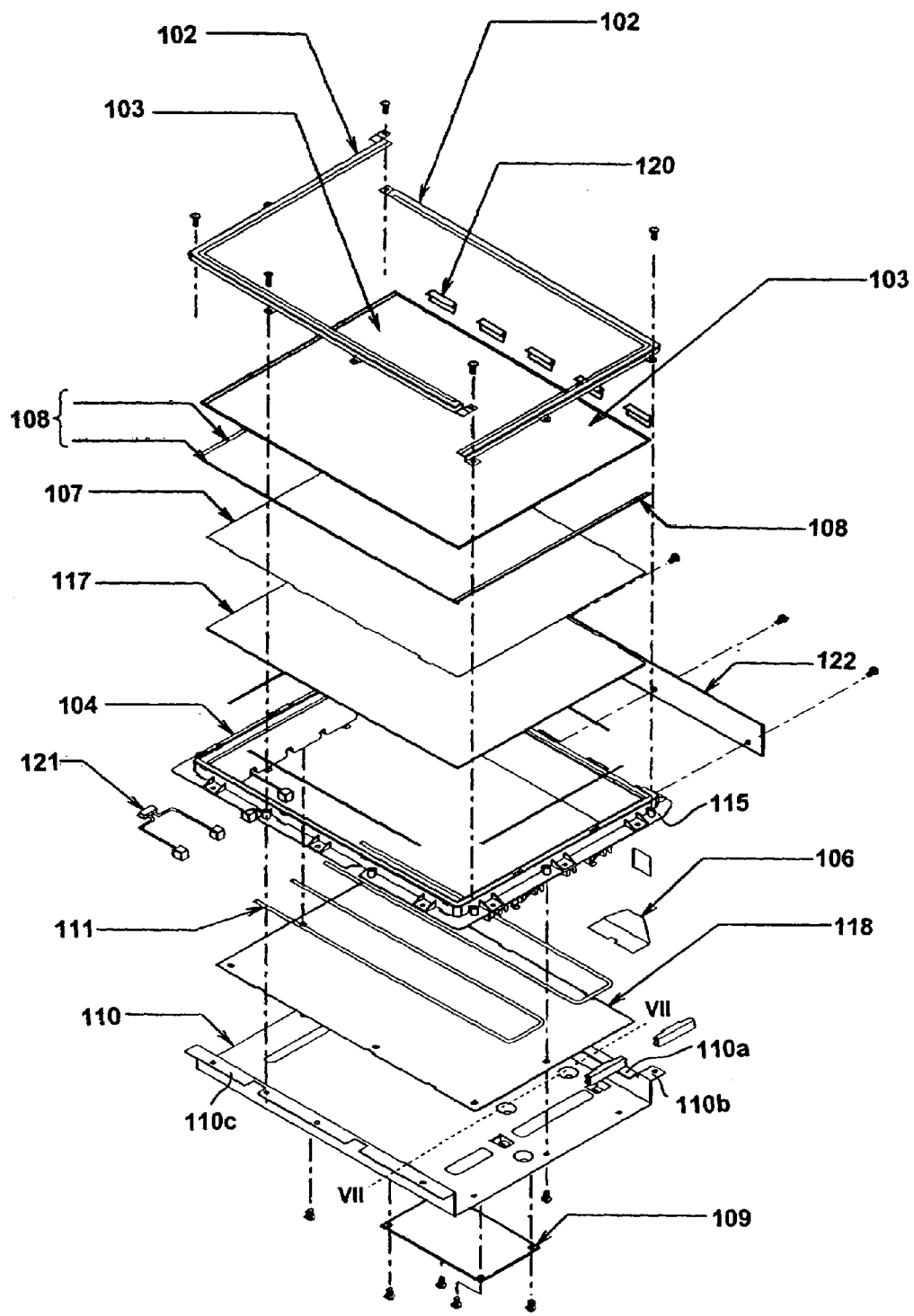
FIG. 6 is an exploded view of a liquid crystal module in accordance with another embodiment of the present invention.
Figure 7:
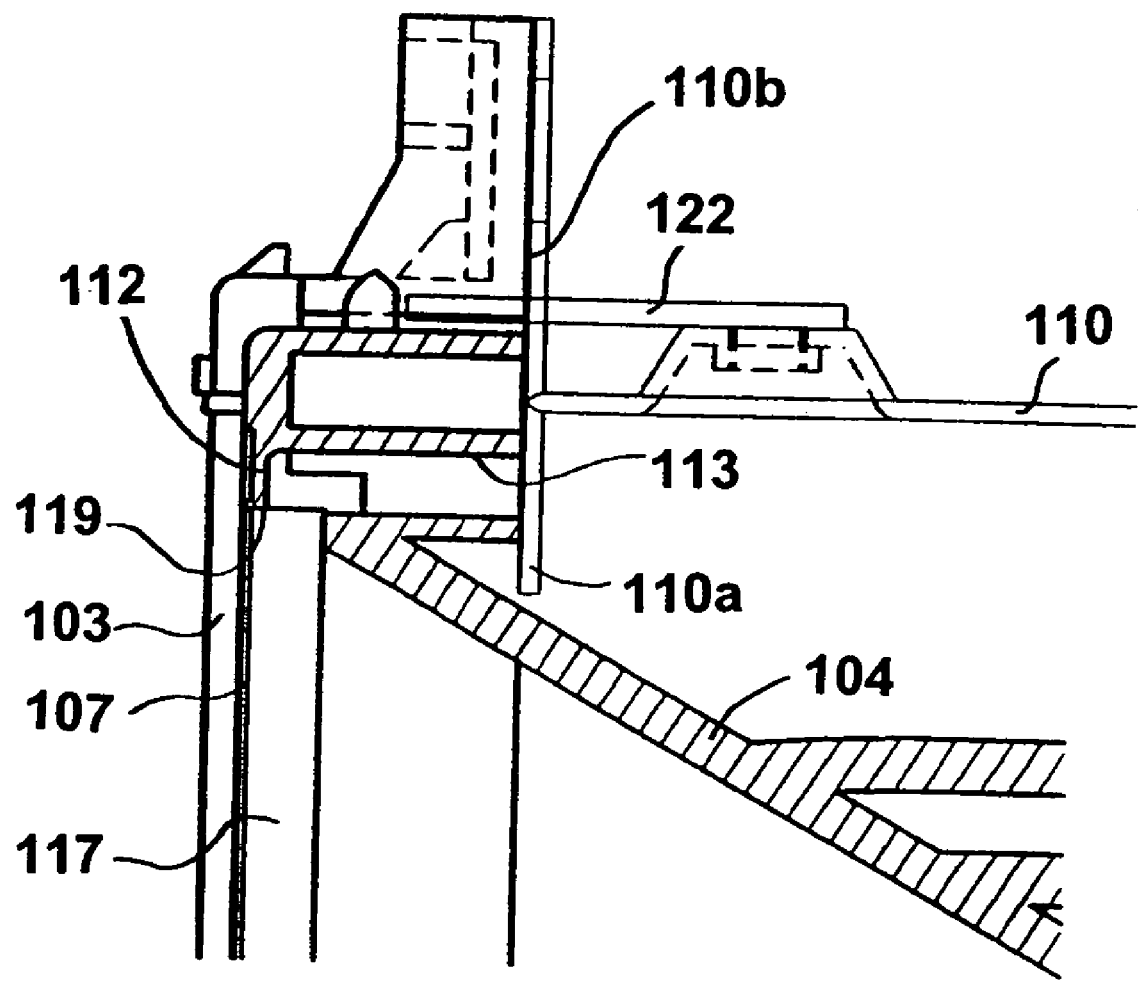
FIG. 7 is a schematic cross sectional view of the liquid crystal module shown in FIG. 6, viewed in the line VII—VII in FIG. 6.

Furthermore, it is possible to close the bosses and the through holes of the ribs with a rear frame. FIGS. 6 and 7 show an example of such structure. A liquid crystal module 101 include a bezel assembly 102, a liquid crystal cell 103, a diffuser sheet 107, diffuser panel 117, a reflector frame 104, cold cathode fluorescent lamp 111, a reflector sheet 118, a rear frame 110, an FPC 106, masking tapes 108, source driver ICs 120, a lamp assembly 121, X PCB 122, and a digital PCB assembly 109.

As seen in FIG. 6, the reflector frame 104 is a substantially rectangular frame molded from a polycarbonate resin, and is formed with the opening 119, which penetrates through the front to the back of the reflector frame 104. The reflector frame 104 functions as the casing of the liquid crystal module 101, and also reflects the light from the cold cathode tubes 111 toward the liquid crystal cell 103 side.

The rear frame 110 is a metal frame that has a substantially cuboid cross sectional shape, and is disposed so as to cover the reflector sheet 118 from the rear side of the reflector frame 104. At the same time, the rear frame 110 is disposed so as to cover rear sides of the reflector frame 104.

A protruding portion (an example of catch portion) 112 is formed at the front peripheral edge of the opening 119 of the reflector frame 104. Through holes 113 are formed below the protruding portion 112 as shown in detailed view of FIG. 7, and bosses 115 are formed on the flange portion 104a as shown in FIG. 6. The diffuser panel 117 is snugly fitted in the protruding portion 112, and the diffuser sheet 107 and the liquid crystal cell 103 are placed over the diffuser panel 117 in this order.

As shown in FIG. 7, the top portion of the rear frame 110 is bent inward except at the edge. This inward bent portion 10a closes the through holes 113, while the outward bent portion 110b allows the rear frame 110 to be coupled to the reflector frame 104. On the bottom portion of the rear frame 110, the flange 110c is bent outward, and is coupled to the bosses 115 of the reflector frame 104 with screws. Therefore, it is possible to prevent dust from entering the space between the diffuser sheet 107 and the liquid crystal cell 103.

Also in the forgoing embodiment, the ribs 14 are formed at the peripheral edge of the through holes 13 that are formed on the outside of the top side 23 of the reflector frame 4, and the bosses 15 are formed near the through holes 13. However, the ribs 14 and the bosses 15 need not be formed, and the relay board 7 can instead be structured to close the through holes 13 directly.

Also in the forgoing embodiment, the shape of the front side of the catch 12 on the front side of the reflector frame 4 is substantially rectangular in shape, but may instead be formed in other shape such as substantially circular, or substantially trapezoidal. Due to the characteristics of the mold, the shape of the openings of the through holes 13 will be substantially the same as the shape of the front side of the catch 12. However, as long as the relay diffuser panel 17 can be coupled between the catches 12 and the border 21 easily, and as long as the shape of the openings of the through holes 13 and the corresponding cross sectional shape of the catch 12 do not allow easy infiltration of dust, the shape of the opening of the through holes 13 can be modified as desired.

Also in the forgoing embodiment, the driver ICs that supply scanning signals to the scan lines of the liquid crystal cell 3 are mounted on the liquid crystal cell 3, the driver ICs 20 that supply drive signals to the data lines of the liquid crystal cell 3 are mounted on the FPC 6, connecting the driver ICs 20 to the digital PCB 9 via the relay board 7, and blocking the through holes 13 with the relay board 7. However, the digital PCB and the driver ICs that supply scanning signals to the scan lines may instead be connected via the relay board. In this case, the catches 12 and the through holes 13 formed on the top and bottom sides of the reflector frame 4 in this embodiment can be provided on the left and right sides of the reflector frame 4, such that the through holes 13 formed on either the left or right side of the reflector frame 4, or those formed on both sides, can be blocked by the relay board 7.

With a direct backlight type liquid crystal module 1 in accordance with this embodiment, since the catches 12 and the borders 21 where the diffuser panel 17 is attached are formed on the front side of the reflector frame 4, the diffuser panel 17 can be easily coupled thereto by being fitted between the catches 12 and the borders 21.

Also, with the direct backlight type liquid crystal module 1 in accordance with this embodiment, the relay board 7 is disposed so as to close the through holes 13 that are formed on the top side 23 of the reflector frame 4. Therefore, infiltration of dust can be prevented not only from the through holes 13 into the space between the liquid crystal cell 3 and the diffuser panel 17, but from dust that has adhered to the top side 23.

Furthermore, since the cross sectional shape of the through holes 13 formed on the top and bottom sides of the reflector frame 4 is substantially rectangular, and the cylindrical ribs 14 are formed at the peripheral edge of the through holes 13, any dust that has adhered to the top and bottom sides of the reflector frame 4 can be prevented from entering the space between liquid crystal cell 3 and the diffuser panel 17 through the through holes 13.

In addition, with the direct backlight type liquid crystal module 1 in accordance with this embodiment, the length from the base to the tip of the bosses 15 is substantially the same as that of the ribs 14 formed in the outer wall of the top side 23 of the reflector frame 4. Also, the angle of inclination of the tip faces of the ribs 14 and the bosses 15 are substantially equal with respect to the horizontal direction, and the relay board 7 is supported at the tip faces of the bosses 15 and the ribs 14 so as to close the through holes 13.

Therefore, it is possible to for the relay board 7 to close the through holes 13 without any gaps therebetween, which prevents any dust that has adhered near the through holes 13 from entering the space between the liquid crystal cell 3 and the diffuser panel 17.

Also, with the direct backlight type liquid crystal module 1 in accordance with this embodiment, the metal rear frame 10 is flanked with the relay board 7 and the bosses 15, and the relay board 7 is screwed to the bosses 15 so as to close the through holes 13. Therefore, the relay board 7 can be securely attached to the bosses 15, and any dust that has adhered near the through holes 13 can be prevented from entering the space between the liquid crystal cell 3 and the diffuser panel 17. Furthermore, since the metal rear frame 10 is flanked with the relay board 7 and the bosses 15, this arrangement also serves to ground the relay board 7.

With the present invention, it is possible to prevent dust from entering the space between the liquid crystal cell and the diffuser plate of a direct backlight type liquid crystal module.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-21811. The entire disclosure of Japanese Patent Application No. 2004-21811 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A liquid crystal module, comprising:
    an annular casing molded from resin and having an outer peripheral portion, a through hole formed through the outer peripheral portion of the casing from a front side of the casing to a rear side of the casing, and a catch portion integrally formed on the outer peripheral portion at a front end of the through hole;
    a diffuser panel attached to the front side of the casing by coupling to the catch portion so as to close the through hole from the front side;
    a liquid crystal cell disposed on the front side of the casing so as to cover a front side of the diffuser panel; and
    a substrate attached to the rear side of the casing, the substrate closing the through hole from the rear side.

2. The liquid crystal module according to claim 1, wherein the catch portion is tapered toward its tip end.

3. The liquid crystal module according to claim 1, wherein a rib portion is formed on the casing so as to surround the through hole formed in the outer peripheral portion of the casing.

4. The liquid crystal module according to claim 3, wherein the casing has a boss portion formed near the rib portion, and
    a tip surface of the rib portion and a tip surface of the boss portion have the same angle of inclination, such that substrate is tightly attached to the tip surfaces of the rib portion and the boss portion from the rear side.

5. The liquid crystal module according to claim 4, wherein the substrate and the boss portion are fastened with a screw.

6. The liquid crystal module according to claim 4, wherein the substrate includes a metal rear frame that has a substantial U-shaped cross sectional shape, and
    the rear frame is attached to the boss portion from the rear side.

7. The liquid crystal module according to claim 6, wherein the substrate further includes a relay board that is attached to the rear frame from the rear side, and
    the through hole is closed with the relay board from the rear side.

8. The liquid crystal module according to claim 6, wherein the through hole is closed with the rear frame from the rear side.

9. The liquid crystal module according to claim 4, wherein the casing has a plurality of boss portions and a plurality of through holes formed thereon, and
    the substrate is attached to the plurality of boss portions from the rear side, and closes the plurality of through holes from the rear side.

10. A liquid crystal module, comprising:
    an annular casing molded from resin and having a plurality of boss portions, a plurality of through holes that is formed on an outer peripheral portion of the casing, a plurality of catch portions formed at front ends of the plurality of through holes, and a plurality of rib portions being formed so as to surround the through holes;
    a diffuser panel attached to a front side of the casing so as to close the plurality of through holes from the front side;
    a diffuser sheet attached to a front side of the diffuser panel;
    a liquid crystal cell disposed on the front side of the casing so as to cover a front side of the diffuser sheet; and
    a substrate attached to the casing from the rear side by being attached to the boss portions from the rear side with screws, the substrate including a metal rear frame that has a substantial U-shaped cross sectional shape, and a relay board that is attached to the rear frame from the rear side, the relay board closing the through holes from the rear side, the rear frame being attached to the boss portions from the rear side,
    wherein
    each of the plurality of catch portions is tapered toward its tip end, and
    a tip surface of the rib portion and a tip surface of the boss portion have the same angle of inclination, such that rear frame is tightly attached to the tip surface of the boss portion from the rear side and the relay board is tightly attached to the tip surface of the rib portion from the rear side.

* * * * *